(12) United States Patent
Liao et al.

(10) Patent No.: US 8,843,493 B1
(45) Date of Patent: Sep. 23, 2014

(54) DOCUMENT FINGERPRINT

(71) Applicant: Narus, Inc., Sunnyvale, CA (US)

(72) Inventors: Yong Liao, Sunnyvale, CA (US);
Antonio Nucci, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 177 days.

(21) Appl. No.: 13/622,316

(22) Filed: Sep. 18, 2012

(51) Int. Cl.
*G06F 17/30* (2006.01)
*G06F 17/27* (2006.01)

(52) U.S. Cl.
CPC ........ *G06F 17/30985* (2013.01); *G06F 17/274* (2013.01)
USPC ........................................................ 707/737

(58) Field of Classification Search
CPC ............ G06F 17/274; G06F 17/30705; G06F 17/30985
USPC .................................................. 707/737, 739
See application file for complete search history.

(56) References Cited

U.S. PATENT DOCUMENTS

| | | | | |
|---|---|---|---|---|
| 6,978,419 B1 * | 12/2005 | Kantrowitz | .................... | 715/209 |
| 7,734,627 B1 * | 6/2010 | Tong | ............................ | 707/737 |
| 7,984,029 B2 * | 7/2011 | Alspector et al. | ............. | 707/698 |
| 8,266,121 B2 * | 9/2012 | Roitblat et al. | ............... | 707/694 |
| 8,620,907 B2 * | 12/2013 | Risvik et al. | .................. | 707/723 |
| 2002/0114515 A1 * | 8/2002 | Hotta et al. | ..................... | 382/177 |
| 2005/0060643 A1 * | 3/2005 | Glass et al. | ................. | 715/501.1 |
| 2006/0029296 A1 * | 2/2006 | King et al. | ..................... | 382/313 |
| 2008/0044016 A1 * | 2/2008 | Henzinger | ..................... | 380/201 |
| 2011/0153653 A1 * | 6/2011 | King et al. | ..................... | 707/769 |
| 2011/0295856 A1 * | 12/2011 | Roitblat et al. | ............... | 707/737 |
| 2011/0311140 A1 * | 12/2011 | Urbach et al. | ............... | 382/182 |
| 2012/0290597 A1 * | 11/2012 | Henzinger | ..................... | 707/758 |
| 2013/0173563 A1 * | 7/2013 | Alspector et al. | ............. | 707/692 |
| 2013/0212090 A1 * | 8/2013 | Sperling et al. | ............... | 707/723 |
| 2014/0075566 A1 * | 3/2014 | Farkash et al. | .................. | 726/26 |

* cited by examiner

*Primary Examiner* — Jorge A Casanova
(74) *Attorney, Agent, or Firm* — Fernandez & Associates, LLP

(57) ABSTRACT

A method for comparing documents, including extracting, by a computer processor, a plurality of extracted elements from a first image of a first formatted document, wherein each of the plurality of extracted elements corresponds to a text element of the first formatted document, extracting, by the computer processor, a first plurality of text fingerprints from a sequence of the plurality of extracted elements to form a first text feature of the first image, comparing, by the computer processor, the first text feature and a second formatted document to generate a comparison result, and determining, in response to the comparison result meeting a pre-determined criterion, that each of the first formatted document and the second formatted document contains common text content.

25 Claims, 4 Drawing Sheets

This paper represents our methodology to fingerprint documents written in English language.

FIG. 3A *A paragraph in a formatted document*

(this paper), (paper represents), (represents our), (our methodology), (methodology to), (to fingerprint), (fingerprint documents), (documents written), (written in), (in english), (english language)

FIG. 3B *The set of 2-grams serving as the content feature of the paragraph*

Length of Words in Line #1: 111, 147, 264, 87, 347, 50, 278, 147
Length of Words in Line #2: 151, 186, 46, 198, 232
Length of Line #1: 1589
Length of Line #2: 951

FIG. 3C *The length of all words and lines in the paragraph. The length is measured as number of pixels.*

70, 93, 166, 55, 218, 31, 175, 93, 159, 196, 48, 208, 244

FIG. 3D *Normalized length of all words when setting M = 1000. For example, the normalized length of the first word in line #1 is computed as Rnd(111/1589\*1000)=70*

(70 93 166 55), (93 166 55 218), (166 55 218 31), (55 218 31 175), (218 31 175 93), (31 175 93 159), (175 93 159 196), (93 159 196 48), (159 196 48 208), (196 48 208 244)

FIG. 3E *The set of 4-grams serving as the geometric feature of the paragraph*

DOCUMENT FINGERPRINT

BACKGROUND OF THE INVENTION

Large volumes of digital documents are generated every moment in the information era. Digitalized documents make it much easier for different people to coordinate and share information. Publishers are producing more content in digital forms; eBooks are becoming increasingly popular among readers; enterprises are becoming paper-less in their daily operations. Digitalizing documents also creates the threat where valuable documents can be easily copied and subject to unauthorized use. The problem is particular serious for enterprises, where their documents are often proprietary and copyright sensitive. Unauthorized copying and using of those documents can cause serious economic damages to the document owners.

Document fingerprinting is the technique to extract features from large sets of documents (referred to as the corpus), so that copying, including partial copies of documents, can be identified with high confidence using those features. A document fingerprint system can be applied to search similar documents inside a large corpus, detect plagiarism of existing documents, detect leakage of sensitive documents, etc. Corpus is all the writings or works of a particular kind or on a particular subject, such as the complete works of an author. Throughout this disclosure, the terms "corpus" and "library" may be used interchangeably depending on the context.

An inverted index (also referred to as postings file or inverted file) is an index data structure storing a mapping from content, such as words or numbers, to its locations in a database file, or in a document or a set of documents. The inverted index data structure is a central component of a typical full text search system. A goal of a search engine implementation is to optimize the speed of the query: find the documents where word X occurs. Once a forward index is developed, which stores lists of words per document, it is next inverted to develop an inverted index. Querying the forward index would require sequential iteration through each document and to each word to verify a matching document. The time, memory, and processing resources to perform such a query are not always technically realistic. Instead of listing the words per document in the forward index, the inverted index data structure is developed which lists the documents per word.

SUMMARY

In general, in one aspect, the invention relates to a method for comparing documents. The method includes extracting, by a computer processor, a plurality of extracted elements from a first formatted document, wherein each of the plurality of extracted elements corresponds to a text element of the first formatted document, extracting, by the computer processor, a first plurality of text fingerprints from a sequence of the plurality of extracted elements to form a first text feature of the first formatted document, comparing, by the computer processor, the first text feature and a second formatted document to generate a comparison result, and determining, in response to the comparison result meeting a pre-determined criterion, that each of the first formatted document and the second formatted document contains a common text content.

Other aspects and advantages of the invention will be apparent from the following description and the appended claims.

BRIEF DESCRIPTION OF DRAWINGS

FIGS. 3A-3E shows an application example in accordance with embodiments of the invention.

DETAILED DESCRIPTION

Figure 1:
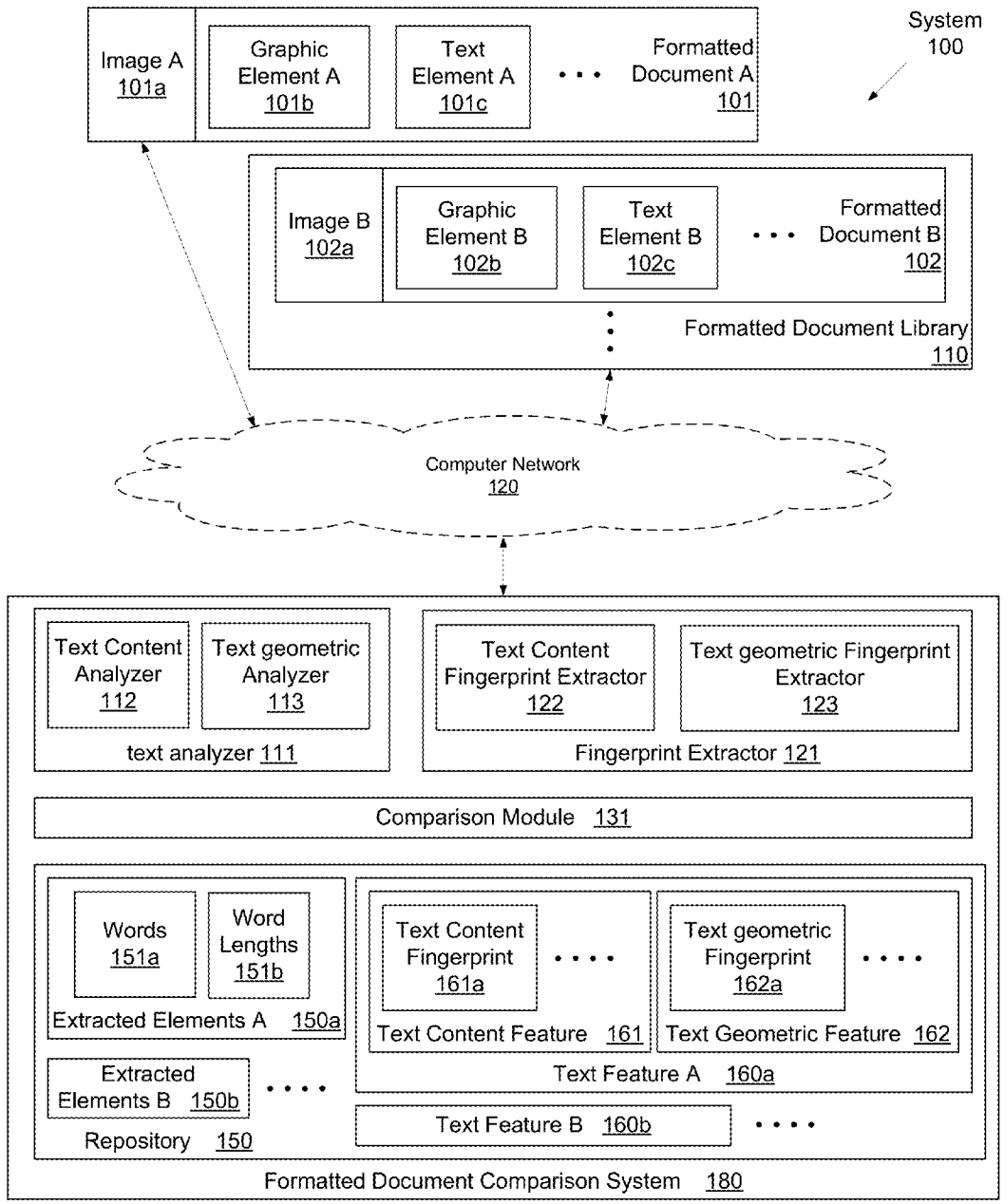
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments of the invention provide a method and a system for fingerprinting formatted documents with mostly textual content. Examples of formatted textual documents include paper documents as well as electronic documents, such as those in the MS Word, PowerPoint, PDF, or other suitable electronic formats. In one or more embodiments, the document fingerprinting addresses the threat where malicious users uses a PrintScreen function to copy a displayed document, uses a camera to take a picture of a displayed or printed document, or uses a photo copier to copy a printed document. As is known to those skilled in the art, the PrintScreen function is activated by a computer user command to copy whatever is currently on the display screen to a data buffer. The copied content in the data buffer can then be printed as a hardcopy or converted to an electronic file. While the camera and the photo copier may use optical scanning technique, the PrintScreen function may be considered as an electronic scanning technique where the displayed content on the computer screen is copied by scanning a display buffer driving the computer screen.

In addition, the malicious user may also uses an optical character recognition (OCR) tool to capture an OCR result of these unauthorized copies. The malicious user then illegally distributes the document content via the copied images and/or the OCR results to other unauthorized third parties.

In one or more embodiments, two types of features of text information in a document are used to extract the unique and reliable fingerprints of the document. Those two features are referred to as text content feature and text geometric feature. The text content feature captures the information of what are the words used in a document and how those words are used to compose phrases and sentences; the text geometric feature captures the information of how the words are physically arranged on each page into lines of the document. In one or more embodiments, whether using the content feature or the geometric feature, a set of n-grams are extracted from the text information feature as the fingerprints of a document. In one or more embodiments, when building the fingerprint of a document via its text content feature, a "gram" is a word in the document; when building fingerprint via its text geometric feature, a "gram" is an integer number representing the length of a word normalized by the length of the line where that word belongs to. For example, the word length and line length may be measured by number of pixels when the document is shown on screen.

In one or more embodiments, the features of all documents in a corpus are extracted, these extracted features are used to determine whether a document A is a copy of another document B in the corpus. Specifically, the text content and geometric features of document A are extracted and then matched to the features of documents in the corpus. In one or more embodiments, searching for a matched document in a corpus is based on performing lookup in the inverted indices that map features to documents in the corpus. Accordingly, the inverted index associated with the documents in the corpus is used to search for another document B in the corpus that is very similar to document A. In one or more embodiments, a document searching technique via inverted index known to those skilled in the art may be used.

In one or more embodiments, two documents A and B are compared by comparing their extracted features to determine if they share a common portion (i.e., a common text content).

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

A shown in FIG. 1, the system (100) includes a formatted document A (101) and associated image A (101a), a formatted document library (110) (i.e., the corpus) having formatted documents (e.g., formatted document B (102) and associated image B (102a)), and a formatted document comparison system (180) having a text analyzer (111), a fingerprint extractor (121), a comparison module (131), and a repository (150) storing sets of extracted elements (e.g., extracted elements A (150a) from the image A (101a), extracted elements B (150b) from the image B (102a), etc.), and text features (e.g., text feature A (160a) of the formatted document A (101), text feature B (160b) of the formatted document B (102), etc.).

Further as shown in FIG. 1, the formatted document A (101) and the formatted document B (102) are textual documents (e.g., a paper document or an electronic document, such as in the MS Word, PowerPoint, PDF, or any other suitable electronic format) having mostly textual content. For example, each of the formatted document A (101) and the formatted document B (102) includes a large number of text elements (e.g., text element A (101c), text element B (102c), etc.) and optionally includes some graphic element(s) (e.g., graphic element A (101b), graphic element B (102b)). In one or more embodiments, each of the image A (101a) and image B (102a) is optically or electronically captured from the formatted document A (101) and the formatted document B (102), respectively. For example the image A (101a) may be captured using photographing, scanning, or other form of image capturing technique from the formatted document A (101) itself if it is a paper document or from a displayed/printed version of the formatted document A (101) if it is in an electronic format. In particular, a camera, a photo copier, or the PrintScreen function may be used to generate the image A (101a). Note that the formatted document A (101) may itself be in an image format, in which case the image A (101a) may be the original image of the formatted document A (101) or a copy of the original image. Throughout this disclosure depending on the context, the term "document image" may refer to a captured image of a formatted document, the original image of a formatted document if it is already in an image format, or a copy of such original image. Further, the terms "document," "document image," and "document in image format" may be used interchangeably depending on the context. In one or more embodiments, the formatted document A (101) and/or the image A (101a) is a result of un-authorized copying from the formatted document B (102) and/or the image B (102b).

Further as shown in FIG. 1, one or more of the formatted document A (101) and associated image A (101a), the formatted document library (110), the formatted document B (102) and associated image B (102a), and the formatted document comparison system (180) are coupled directly or coupled via a computer network (120) having wired/wireless portions of local area network, wide area network, Internet, and/or other computer and communication networks. In other words, the formatted document A (101) or the associated image A (101a) may be inputted, using a suitable input device, into the formatted document comparison system (180) directly or via the computer network (120). For example, the formatted document A (101) may be in the PDF or JPG format that is inputted into the formatted document comparison system (180) as an electronic file. In another example, the formatted document A (101) may be a paper document that is converted into the image A (101a) using an optical scanning device and inputted into the formatted document comparison system (180).

In one or more embodiments, the text analyzer (111) is configured to extract a set of extracted elements (e.g., extracted elements A (150a)) from a first image (e.g., image A (101a)) of a first formatted document (e.g., formatted document A (101)). In particular, each element of the extracted elements A (150a) corresponds to a text element (e.g., text element A (101c)) of the formatted document A (101). For example, the text element A (101c) may be an alphanumeric character, a syllable, a word, a phrase, etc. in the formatted document A (101).

In one or more embodiments, the text analyzer (111) includes a text content analyzer (112) that is configured to extract words (151a) from the image A (101a). In one or more embodiments, the text analyzer (111) includes a text geometric analyzer (113) that is configured to extract word lengths (151b) from the image A (101a). In one or more embodiments, the text geometric analyzer (113) is further configured to extract a line length (not shown) and normalize each of the word lengths (151b) based on the corresponding line length where the particular word length belongs.

Although not explicitly shown, the extracted elements B (150b) may be extracted using the text analyzer (111) in a similar manner and contains similar words and/or word lengths as those in the extracted elements A (150a).

In one or more embodiments, the text analyzer (111) uses an optical character recognition (OCR) module (e.g., a software algorithm or a hardware unit that is not explicitly shown) to extract the words (151a) and/or word lengths (151b) from the image A (101a). The accuracy of the text analyzer (111) to perform such extractions may be modeled by an OCR error rate model. In one or more embodiments, the OCR error rate model describes the text content OCR error rate for accurately extracting a consecutive segment of the words (151a), such as a n-word segment (i.e., n-gram of words). In one or more embodiments, the OCR error rate model describes the text geometry error rate for extracting a consecutive segment of the word lengths (151b), such as an n-word-length segment (i.e., n-gram of word lengths). For example, the error rate may be a function of the size of the segment (i.e., number of words or word lengths in the n-gram). Typically, the longer the n-gram of words, the higher the error rate in accurately extracting all of the words in the n-gram from the image A (101a).

In one or more embodiments, the fingerprint extractor (121) is configured to extract a set of text fingerprints (e.g., text content fingerprint (161a), text geometric fingerprint (162a), etc.) from a sequence of the extracted elements A (150a) (e.g., a sequence in the words (151a), a sequence in the word lengths (151b)) to form the text feature A (160a) (i.e., text content feature (161) and/or text geometric feature (162)) of the image A (101a).

In one or more embodiments, the fingerprint extractor (121) includes a text content fingerprint extractor (122) that is configured to extract a segment of consecutive words from the words (151a) to form the text content fingerprint (161a). In one or more embodiments, the fingerprint extractor (121) includes a text geometric fingerprint extractor (123) that is configured to extract a segment of consecutive word lengths from the word lengths (151b) to form the text geometric fingerprint (162a). In one or more embodiments, the text geometric fingerprint (162a) is based on normalized word lengths by at least dividing each of the word lengths (151b) by a respective line length where the particular word length belongs. In one or more embodiments, the normalized word lengths are generated using further scaling and rounding operations. An example word length calculation is shown in the equation (5) described later in this disclosure. Using normalized word length based on the respective line length reduces document comparison error due to document image size differences. Additional details of such extractions are described in reference to FIGS. 2 and 3A-3E below.

In one or more embodiments, text content fingerprint (161a) and/or text geometric fingerprint (162a) include n-grams. In one or more embodiments, the fingerprint extractor (121) is further configured to identify the aforementioned OCR error rate model of the text analyzer (111). Generally, the text content OCR error rate is higher than the text geometry error rate for same size segments (e.g., corresponding to same number of words). As noted above, the OCR error rate may be a function of the particular length of the segment of the words (151a) and/or the word lengths (151b) to form the respective fingerprint. Accordingly, the fingerprint extractor (121) determines a length of the n-gram to optimize the document comparison accuracy by balancing the OCR error rate (based on the OCR error rate model) and a document matching error rate (based on a document matching error rate model that will be described later). In general, the optimal n for document comparison may be different depending on whether the comparison is based on the text content feature (161) or the text geometric feature (162).

Although not explicitly shown, the text feature B (160b) may contain similar text content fingerprint and/or text geometric fingerprint as those in the text feature A (160a). In one or more embodiments, the text feature B (160b) is extracted from the image B (102a) in a similar manner as how the text feature A (160a) is extracted from the image A (101a). In one or more embodiments, the text feature B (160b) is extracted directly from the formatted document B (102) when it is in a text format.

In one or more embodiments, the comparison module (131) is configured to compare the text feature A (160a) extracted from the image A (101a) and the formatted document B (102) in the formatted document library (110) to generate a comparison result. For example, the comparison result may be generated during search for a document in the formatted document library (110) that is most similar to the formatted document A (101). In one or more embodiments, the comparison and/or the search is based on inverted index search. Specifically, an inverted index data structure of the formatted document library (110) is formed from text features (e.g., text feature B (160b)) of all documents (e.g., the formatted document B (102)) in the formatted document library (110). In one or more embodiments, the inverted index data structure includes an inverted index for each text fingerprint extracted from any document in the formatted document library (110). The inverted index maps a particular text fingerprint to any document containing the particular text fingerprint and is tagged with a tally of how many times the particular text fingerprint occurring in the mapped document. For example, the text feature B (160b) may include a set of n-grams and a tally for each n-gram occurring in the image B (102a) or occurring directly in the formatted document B (102). This tally is included in the inverted index data structure to tag the inverted index mapping each n-gram in the text feature B (160b). In one or more embodiments, the comparison module (131) is configured to calculate, for each n-gram in the text feature A (160a), a frequency of occurrence for that n-gram occurring in the image B (102) based on inverted index look up of the formatted document library (110) using the inverted index data structure, in particular the portion of the inverted index data structure contributed by the text feature B (160b). In other words, the document comparison result is based at least on the frequency of how often each n-gram in the text feature A (160a) occurring in the image B (102) that is calculated using the text feature B (160b) and the fingerprint (e.g., a tally of a n-gram) tallies therein.

In one or more embodiments, the comparison module (131) is further configured to determine, in response to the comparison result meeting a pre-determined criterion, that the formatted document B (102) is the most similar document in the formatted document library (110) as compared to the formatted document A (101) (or the image A (101a)). Accordingly, each of the formatted document A (101) (or the image A (101a)) and the formatted document B (102) is determined to contain a common text content. In one scenario, the formatted document A (101) and the formatted document B (102) are the same document. In another scenario, the formatted document A (101) may be a superset or a subset of the formatted document B (102). The accuracy of such determination may be modeled by a document matching error rate model that describes the document matching error rate as a function of various parameters, such as the size of the n-gram (i.e., fingerprint) in the text feature A (160a) and text feature B (160b). As noted above, this fingerprint comparison error rate model may be used by the fingerprint extractor (121) to determine a length of the n-gram that optimizes the document comparison accuracy by balancing the OCR error rate and the document matching error rate.

In one or more embodiments, the comparison module (131) is further configured to divide the n-grams in the text feature A (160a) into subsets, such that the inverted index search is performed by concurrently performing subsets searches. For example, the concurrent subsets searches may include at least a first comparison subset search between a first subset of n-grams in the text feature A (160a) and the formatted document B (102) using the inverted index data structure, and a second comparison between a second subset of n-grams in the text feature A (160a) and the formatted document B (102) using the inverted index data structure. In one or more embodiments, the inverted index data structure may also be divided into subsets for performing the comparisons in an even more concurrent manner.

Additional details of calculating the frequency of occurrence, generating the comparison result from the frequency of occurrence, and making the determination from the comparison result are described in reference to FIGS. 2 and 3A-3E below.

In one or more embodiments, the formatted document comparison system (180) is based on text content comparison where the text geometric analyzer (113), the text geometric fingerprint extractor (123), the word lengths (151b), and the text geometric feature (162) are not included. In one or more embodiments, the formatted document comparison system (180) is based on text geometric comparison where the text content analyzer (112), the text content fingerprint extractor (122), the words (151a), and the text content feature (161) are not included.

In one or more embodiments, the aforementioned elements of the formatted document comparison system (180) may include hardware, software, programmable logic, or combinations thereof. For example, one or more of the text analyzer (111), fingerprint extractor (121), and comparison module (131) may include software instructions executing on a hardware processor (not shown) of the formatted document comparison system (180).

Figure 2:
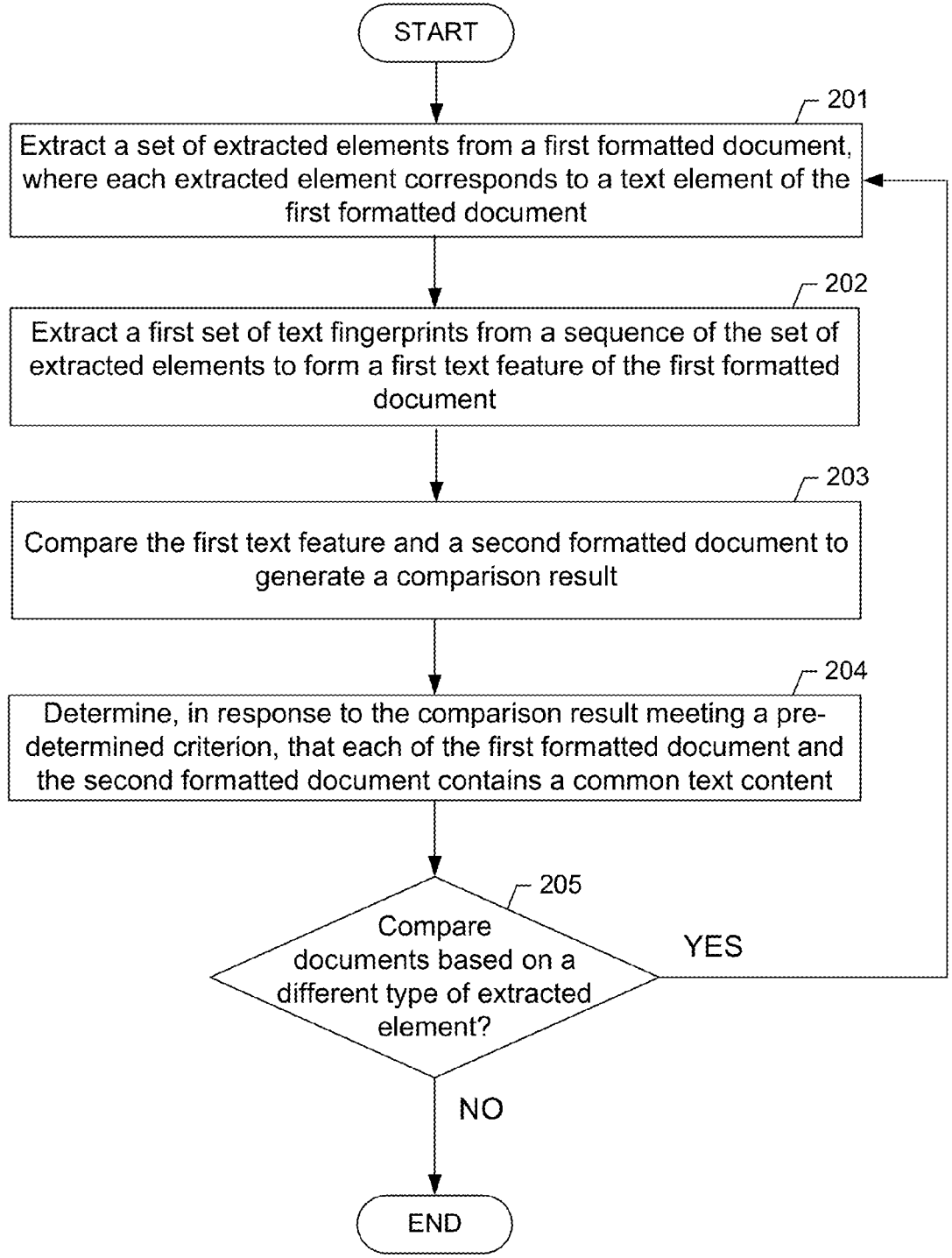
FIG. 2 shows a flowchart of a method according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2.

The flowchart depicted in FIG. 2 describes a method for comparing documents. In particular, the documents being compared are formatted documents. In one or more embodiments, a formatted document is a formatted textual document, which contains textual contents with or without any graphic element. The formatted textual document may be a paper document or an electronic document. For example, the electronic document may be in the format of MS Word, PowerPoint, PDF, or other suitable electronic formats. Further, the paper document may be a hardcopy version of the electronic document.

Initially in Step 201, a set of extracted elements are extracted from an image (referred to as the first image) of a formatted document (referred to as the first formatted document). In one or more embodiments, the first image is a photo image or a scanned image of the first formatted document. For example, the first image may be a result of photographing or scanning a displayed copy or a printed copy of an electronic document. In another example, the first image may be a result of photographing or scanning a paper document. In one or more embodiments, the first image is a result of un-authorized photographing, scanning, or otherwise copying the displayed/printed version of the electronic document or the paper document itself. Note that the electronic document may itself be in an image format, in which case the first image may be the original image of the electronic document or a copy thereof. As noted above, depending on the context, the term "document image" may refer to a photo/scanned image of a formatted document, the original image of a formatted document if it is already in an image format, or a further copy of such original image. Further, the terms "document," "document image," and "document in image format" may be used interchangeably depending on the context.

In one or more embodiments, the extracted elements are extracted using optical character recognition (OCR) technique and each of the extracted elements corresponds to a text element of the first formatted document. For example, the text element may be an alphanumeric character, a word, a phrase, a paragraph, etc. In one or more embodiments, each extracted element is an OCR extracted word corresponding to a word (i.e., a text element) in the first formatted document. In one or more embodiments, each extracted element is the length of an OCR extracted word (referred to as an OCR extracted word length) corresponding to a word (i.e., a text element) in the first formatted document. One skilled in the art will appreciate that there is a non-zero error rate associated with any practical OCR technique. Further, using any practical OCR technique, the reliability or accuracy of the OCR extracted word, as compared to the corresponding word in the first formatted document, is typically lower than the reliability or accuracy of the OCR extracted word length. In other words, an OCR tool typically have errors in the extracted n-gram and the longer the n-gram is, the less probability the OCR tool can correctly extract all characters in the n-gram. However, even when the n-gram may contain some incorrectly extracted character(s), the lengths of words in the n-gram often are still correct.

In Step 202, a set (referred to as the first set) of text fingerprints are extracted from a sequence of set of the extracted elements to form a first text feature of the first image. In the embodiments where each extracted element is an OCR extracted word, the first text feature is a text content feature and each text fingerprint in the text content feature is a text content fingerprint. In one or more embodiments, the text content fingerprint is based on a segment of consecutive words (i.e., a sequence) from all the OCR extracted words of the first image. In the embodiments where each extracted element is the length of an OCR extracted word, the first text feature is a text geometric feature and each text fingerprint in the text geometric feature is a text geometric fingerprint. In one or more embodiments, the text geometric fingerprint is based on a segment of consecutive word lengths (i.e., a sequence) from all the OCR extracted word lengths of the first image. Examples of the text content feature including multiple text content fingerprints and the text geometric feature including multiple text geometric fingerprints are described below as well as in reference to FIG. 3.

In Step 203, the first text feature of the first image and a second formatted document are compared to generate a comparison result. In one or more embodiments, the second formatted document is from a document library containing multiple documents from which a search is performed for the most similar one to the first image and/or the first formatted document. For example, the comparison result may be generated during the search for this most similar document. In one or more embodiments, the comparison and/or the search is based on inverted index search. Specifically, an inverted index data structure of the document library is formed from text features (e.g., a second text feature of the second formatted document) of all documents (e.g., the second formatted document) in the document library. In one or more embodiments, the inverted index data structure includes an inverted index for each text fingerprint extracted from any document in the document library. The inverted index maps a particular text fingerprint to any document containing the particular text fingerprint and is tagged with a tally of how many times the particular text fingerprint occurring in the mapped document. For example, the second text feature may include a set of n-grams and a tally for each n-gram occurring in the second formatted document or a second image thereof. This tally is included in the inverted index data structure to tag the inverted index mapping each n-gram in the second text feature. In one or more embodiments, the comparison result is generated by calculating, for each n-gram in the first text feature, a frequency of occurrence for that n-gram occurring in the second image based on inverted index look up of the document library using the inverted index data structure, in particular the portion of the inverted index data structure contributed by the second text feature. In other words, the document comparison result is based at least on the frequency of how often each n-gram in the first text feature occurring in the second image that is calculated using the second text feature and the fingerprint (e.g., a tally of an n-gram) tallies therein.

In one or more embodiments, the second text feature may be previously generated directly from the second formatted document that is an electronic document. In one or more embodiments, the second text feature may be previously generated from a second image of the second formatted document.

In one or more embodiments, the comparison generates a text feature similarity score between the first text feature and the second text feature. For example, the text feature similarity score may be based on a frequency of occurrence of each text fingerprint of the first text feature also occurring in the second formatted document. In one or more embodiments, the frequency of occurrence is calculated based on the inverted index search described above. Accordingly, the comparison result is based at least on the frequency of occurrence.

In Step 204, in response to the comparison result meeting a pre-determined criterion, it is determined that the second formatted document is the most similar document in the document library as compared to the first formatted document. Accordingly, each of the first formatted document and the second formatted document is determined to contain common text content. For example, the first formatted document and the second formatted documents may be the same. In another example, the first formatted document may be a subset or a superset of the second formatted document.

In Step 205, a determination is made as to whether the first formatted document and the second formatted document are to be compared again based on a different type of extracted elements. For example, the Steps 201 through 204 may have been performed in an initial iteration using OCR extracted words as the extracted elements. In this example, the determination may be whether the comparison is to be performed again using OCR extracted word lengths (e.g., normalized word lengths that are normalized based on the line length where the particular word length belongs) as the extracted elements. In one or more embodiments, the determination may be based on an error rate of the OCR word extraction. For example, the error rate may be determined by matching all OCR extracted words to a dictionary of valid words.

If the match rate exceeds a pre-determined threshold (e.g., 99.9%, 90%, 80%, etc.), the determination is no and the method ends. Said in other words, the match rate exceeding the pre-determined threshold indicates that the OCR word extraction is sufficiently accurate for an acceptable document comparison result. Accordingly, no more comparison needs to be performed further.

If the match rate is less than the pre-determined threshold (e.g., 99.9%, 90%, 80%, etc.), the determination is yes and the method returns to Step 201. Said in other words, the match rate being less than the pre-determined threshold indicates that the OCR word extraction is not accurate enough for an acceptable document comparison result. Accordingly, further comparison needs to be performed. For example, the Steps 201 through 204 may be performed in a second iteration using OCR extracted word lengths as the extracted elements. In one or more embodiments, text geometric features are only extracted in response to determining that the text content match rate to the valid word library is less than the pre-determined threshold.

An example of performing Steps 201 through 204 is described below using either OCR extracted words or the OCR extracted word lengths as the extracted elements.

In one or more embodiments, $C_{doc}$ represents the set of documents (i.e., the corpus) from which their fingerprints are extracted. In one or more embodiments, given a document $\bar{d}$ (i.e., the first formatted document) to be compared, a document $\hat{d} \in C_{doc}$ (i.e., the second formatted document) is identified so that the fingerprints of $\hat{d}$ and $\bar{d}$ match with high confidence. Note that one of $\hat{d}$ and $\bar{d}$ may be a partial copy of another and those two documents may be of different file formats.

In one or more embodiments, the text feature is the text content feature. As noted above, the text content feature extracted from a document d is the sequence of words in the document, represented by $W^d = (w_1^d, w_2^d, \ldots, w_x^d)$, where $w_i^d$ is the $i^{th}$ word in document d. After extracting $W^d$, a set of n-grams is computed from $W^d$ where an n-gram has n words appearing consecutively in $W^d$. For example, the set of 2-grams for $W^d = (s_1^d, w_2^d, w_3^d, w_4^d)$ is $\{(w_1^d, w_2^d)(w_2^d, w_3^d)(w_3^d, w_4^d)\}$. Each n-gram here is referred to as a text content fingerprint of document d. The list of text content fingerprints of document d, represented by $F^d = (f_1^d, f_2^d, \ldots, f_{x-n+1}^d)$, is the text content feature of document d. In one or more embodiments, an inverted index data structure (also referred to simply as the reverse index) of inverted indices is built for mapping those text content fingerprints (i.e., n-grams of words) of d. In one or more embodiments, to reduce the number of unique fingerprints saved in the inverted index data structure, the sequence of words $W^d$ are preprocessed by removing pre-determined "stop words" and stemming the remaining words before computing the text content fingerprints. After processing all documents in corpus $C_{doc}$, an inverted index of $C_{doc}$ is generated for each text content fingerprint (i.e., n-gram of words) of all documents to map the particular text content fingerprint to document(s) containing the particular text content fingerprint in corpus $C_{doc}$.

To determine whether a document $\bar{d}$ is a copy or partial copy of any document in $C_{doc}$, $\bar{d}$ is analyzed to compute a set of text content fingerprints from $\bar{d}$. That is, a sequence of words is extracted from $\bar{d}$, from which n-grams are computed. In one or more embodiments, $\tilde{F}^{\bar{d}} = (f_1^{\bar{d}}, f_2^{\bar{d}}, \ldots, f_{x-n+1}^{\bar{d}})$ represents the set of unique text content fingerprints computed from document $\bar{d}$. In one or more embodiments, $\tilde{F}^{\bar{d}}$ is a set containing unique text content fingerprints of document $\bar{d}$ while $F^d$ can have duplicates. Those text content fingerprints of $C_{doc}$ are searched using the inverted index data structure (i.e., searched using inverted index search) to find a document in the corpus that is most similar to $\bar{d}$. In one or more embodiments, the similarity between document $\bar{d}$ and $\hat{d} \in C_{doc}$ is measured by a text content similarity score $S(\bar{d}, d)$ as the following equation:

$$S(\bar{d}, d) = \frac{1}{k} \sum_{i=1}^{k} \frac{TF(f_i^{\bar{d}}, d)}{DF(f_i^{\bar{d}})^2} \quad (1)$$

where $TF(f_i^{\bar{d}}, d)$ = frequency of $f_i^{\bar{d}}$ appearing in $d$ (2)

$DF(f_i^{\bar{d}})$ = # of documents found by the inverted index search as having $f_i^{\bar{d}}$ (3)

In one or more embodiments, $TF(f_i^{\bar{d}}, d)$ is determined by comparing text content fingerprints of document $\bar{d}$ against text content fingerprints of document d.

In one or more embodiments, document $\bar{d}$ is considered to be a copy or a partial copy of document $\hat{d} \in C_{doc}$ if the conditions in following equation hold, where T is a predefined threshold.

$$\begin{cases} S(\bar{d}, \hat{d}) = \max_{d \in C_{doc}} (S(\bar{d}, d)) \\ S(\bar{d}, \hat{d}) \geq T \end{cases} \quad (4)$$

Fingerprinting documents via their textual content features works well if extracting text from document $\bar{d}$ is reliable. For example, extracting text from an electronic document $\bar{d}$ can be highly reliable. However, reliably extracting text from an image of $\bar{d}$ may be more difficult. For example, reliability of extracting text information from the image pixels of $\bar{d}$ using OCR typically depends on the quality of the image. For a low resolution image with some level of noise, a typical OCR system may completely fail to correctly recognize the text.

Generally, extracting word length in the document image is more reliable than recognizing the actual text. In one or more embodiments, the text geometric feature is used as a higher level document feature to pinpoint a document image as a copy or a partial copy of another document within the corpus. For example, after segmenting the document image into text lines and words, the text geometric feature may be generated based on the length of each word in the document image, as measure by the number of pixels from the left side of a word to the right side of the word. In one or more embodiments, when the OCR error rate in recognizing actual text from the document image is below a pre-determined threshold, the text content feature is not used for document comparison. Instead, the text geometric feature is used by configuring the OCR to recognize geometric regions (e.g., text lines and text words) and associated geometric sizes in the document image.

In one or more embodiments, the word length in a document image is normalized based on the length of the text line it belongs to. Given a formatted document d and each word in word sequence $W^d = (w_1^d, w_2^d, \ldots w_x^d)$, the normalized length of word $w_i^d \in W^d$, $l_i^d$ is computed as:

$$l_i^d = Rnd\left(\frac{WordLength(\omega_i^d)}{LineLength(\omega_i^d)} \times M\right) \quad (5)$$

where WordLength ($w_i^d$) represents the physical length of word $w_i^d$ on the document image, LineLength ($w_i^d$) represents the physical length of the text line where word $w_i^d$ belongs to on the document image, M is a user defined or otherwise pre-determined integer, and function Rnd(x) rounds x to its closest integer.

The sequence of normalized length of all words in document d is represented by $(l_1^d, l_2^d, \ldots, l_x^d)$. An n-gram computation is then applied to this integer sequence. In one or more embodiments, a text geometric fingerprint $f_i^d$ is an n-gram $(l_i^d, d_{i+1}^d, \ldots, l_{i+n-1}^d)$. The list of text geometric fingerprints computed from document d, denoted by $F^d = (f_1^d, f_2^d, \ldots, f_k^d)$ is the text geometric feature of document d. Feature $F^d$ is then added into a text geometric inverted index of $C_{doc}$ that maps text geometric fingerprints (i.e., n-grams of normalized word lengths) to documents containing those text geometric fingerprints for all documents in corpus $C_{doc}$.

To determine whether a document $\bar{d}$ is a copy or partial copy of a document in $C_{doc}$, $\bar{d}$ is analyzed to compute a set of text geometric fingerprints $\tilde{F}^{\bar{d}} = (f_1^{\bar{d}}, f_2^{\bar{d}}, \ldots, f_k^{\bar{d}})$ from $\bar{d}$. For each fingerprint $f_i^{\bar{d}} = (l_i^{\bar{d}}, l_{i+1}^{\bar{d}}, \ldots, l_{i+n-1}^{\bar{d}})$, (it is expanded into a set of fingerprints by making small changes to each of the n integer in $f_i^{\bar{d}}$. Let $\Psi$ be the fingerprint expanding operator defined below:

$$\Psi(f_i^{\bar{d}}) = \left\{ (l_0, l_1, \ldots, l_{n-1}) \mid l_j \in \mathbb{Z} \text{ and } \frac{|l_j - l_{i+j}^{\bar{d}}|}{l_{i+j}^{\bar{d}}} < \sigma, \forall j \in [0, n-1] \right\} \quad (6)$$

where $\sigma$ is a predefined small number referred to as fuzzy range, and $\mathbb{Z}$ is the set of integers.

In one or more embodiments, a text geometric similarity score is used to identify the document in $C_{doc}$ that is most similar to $\bar{d}$ when comparing them by their text geometric features. The text geometric similarity score between document $\bar{d}$ and $d \in C_{doc}$ is computed as $$S(\bar{d}, d) = \frac{1}{k} \sum_{i=1}^{K} \sum_{f \in \Psi(f_i^{\bar{d}})} \frac{TF(f, d)}{DF(f)^2} \quad (7)$$

In one or more embodiments, the document $\bar{d}$ is considered to be a copy or partial copy of document $\hat{d} \in C_{doc}$ if the conditions in the following equation hold, where T is a predefined threshold.

$$\begin{cases} S(\bar{d}, \hat{d}) = \max_{d \in C_{doc}} (S(\bar{d}, d)) \\ S(\bar{d}, \hat{d}) \geq T \end{cases} \quad (8)$$

In one or more embodiments, the text fingerprints are based on n-grams extracted using OCR techniques. On one side assuming all n-gram fingerprints are accurately extracted from the document, document comparison accuracy becomes better as the length of n-gram increases. On the other side, the larger the parameter n is, the more likely an n-gram may be different from its original value due to possible OCR errors. When computing the text content similarity between document d and its copy $\bar{d}$, an n-gram extracted from $\bar{d}$ leads to smaller similarity score as computed by equation (7) if the value of that n-gram is different from its original value. This is because the term frequency $TF(f_i^{\bar{d}}, d)$ of that n-gram will most likely be 0.

Considering both these conflicting effects of the length of the n-gram on the document comparison accuracy versus the n-gram extraction accuracy, a compromised n-gram length may be determined to optimize the overall compounded accuracy based on an OCR error rate model. The OCR error rate model represents error rate of an optical character recognition (OCR) module used to extract the extracted elements from the document image.

The OCR error rate is defined as the probability that a character in the extracted text is different from the actual character. In one or more embodiments, a simplified error rate model assumes that the probability of each character to be in is the same. In one or more embodiments, a more sophisticated error rate model may define variable probability of a particular character to be in error depending on which character it is, the position of the particular character in the document, the surrounding characters next to the particular document, and other relevant parameters.

In one or more embodiments, text feature comparison is performed in a concurrent manner. Specifically, the dividing the set of text fingerprints is divided into subsets for performing concurrent comparisons. In other words, the comparison of the first text feature and the second text feature is partitioned into multiple concurrent comparisons. For example, a first comparison between a first subset of the divided subsets and the second text feature, and a second comparison between a second subset of the divided subsets and the second text feature are performed concurrently.

Let $F^{\bar{d}}$ be the set of fingerprints of document $\bar{d}$. In one or more embodiments, $F^{\bar{d}}$ is divided into K subsets, and denoted as $F_1^{\bar{d}}$ through $F_K^{\bar{d}}$. Then K parallel (i.e., concurrent) comparisons are launched simultaneously, where each of them produces a result regarding document $\bar{d}$ can be pinpointed to which document in $C_{doc}$. Among those K results, in one or more embodiments, a policy may be devised to pinpoint $\bar{d}$ to a document $\hat{d} \in C_{doc}$ if there are more than K/2 results indicating $\bar{d}$ should be pinpoint to document $\hat{d}$. In other embodiments, a different policy may be based on voting where the document that most results agree on is chosen.

FIGS. 3A-3E show an example of text content feature and text geometric feature of a formatted document. A document comparison application using this example may be practiced using the system (100) of FIG. 1 and based on the method described with respect to FIG. 2 above.

FIG. 3A shows an example formatted document having a single paragraph. FIG. 3B shows a set of 2-grams (i.e., text content fingerprints) extracted from the formatted document as its text content feature. FIG. 3C shows the length (as measured in number of pixels) of all words in the formatted document. FIG. 3D shows normalized length of all words when the user defined parameter M=1000. FIG. 3E shows a set of 4-grams (i.e., text geometric fingerprints) extracted from the formatted document as its text geometric feature.

Figure 4:
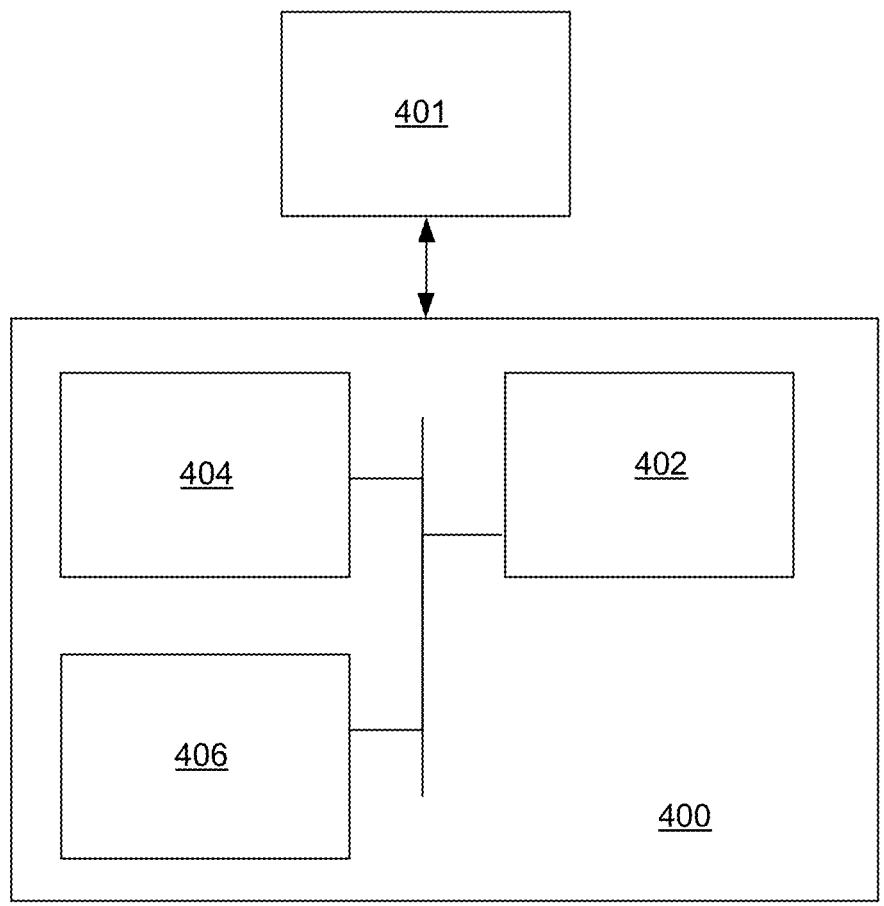
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for comparing documents, comprising:
   extracting, by a computer processor, a plurality of extracted elements from a first formatted document, wherein each of the plurality of extracted elements corresponds to a text element of the first formatted document, wherein the plurality of extracted elements comprises at least one selected from a group consisting of a plurality of words and a plurality of word lengths;
   extracting, by the computer processor, a first plurality of text fingerprints from a sequence of the plurality of extracted elements to form a first text feature of the first formatted document, wherein the first plurality of text fingerprints comprises at least one selected from a group consisting of a plurality of word n-grams and a plurality of word length n-grams, wherein the first text feature comprises at least one selected from a group consisting of a first text content feature based on the plurality of word n-grams and a first text geometric feature based on the plurality of word length n-grams;
   comparing, by the computer processor, the first text feature and a second text feature of a second formatted document to generate a comparison result, wherein the second text feature comprises at least one selected from a group consisting of a second text content feature and a second text geometric feature, wherein the comparison result comprises at least one selected from a group consisting of a text content match rate between the first and second text content features and a text geometric match rate between the first and second text geometric features; and
   determining, in response to the comparison result meeting a pre-determined criterion, that each of the first formatted document and the second formatted document contains common text content, wherein the comparison result meeting the pre-determined criterion is based on at least one selected from a group consisting of the text content match rate and the text geometric match rate exceeding a pre-determined threshold.

2. The method of claim 1, further comprising:
   calculating a frequency of occurrence of the first plurality of text fingerprints in the second formatted document, wherein the comparison result is further based on the frequency of occurrence.

3. The method of claim 1, further comprising:
extracting a second plurality of text fingerprints from the second formatted document to form the second text feature of the second formatted document; and
generating, based at least on the second text feature, an inverted index data structure for a document library comprising the second formatted document,
wherein the inverted index data structure comprises a tally of at least one of the second plurality of text fingerprints occurring in the second formatted document, and
wherein the comparison result is generated using the inverted index data structure.

4. The method of claim 1,
wherein the plurality of extracted elements are extracted from a first image generated from at least one selected from a group consisting of a displayed copy and a printed copy of the first formatted document.

5. The method of claim 4, wherein the first plurality of text fingerprints comprises a plurality of n-grams, the method further comprising:
identifying an error rate model of an optical character recognition (OCR) module used to extract the plurality of extracted elements from the first image; and
determining a length of the n-gram based on the error rate model.

6. The method of claim 1,
wherein the first formatted document and the second formatted documents contain the same text content.

7. The method of claim 1,
wherein the first formatted document comprises at least one selected from a group consisting of a subset and a superset of the second formatted document.

8. The method of claim 1, wherein the plurality of extracted elements comprises a plurality of words, the method further comprising:
extracting a segment of consecutive words from the plurality of words,
wherein the first plurality of text fingerprints is based at least on the segment.

9. The method of claim 1, wherein the plurality of extracted elements comprises a plurality of word lengths, the method further comprising:
extracting a segment of consecutive word lengths from the plurality of word lengths,
wherein the first plurality of text fingerprints is based at least on the segment.

10. The method of claim 9, wherein at least one word length of the plurality of word lengths is normalized based on a line length where the at least one word length belongs.

11. The method of claim 1,
wherein the first and second text geometric features are extracted in response to determining that the text content match rate is less than the pre-determined threshold.

12. The method of claim 1, further comprising:
dividing the first plurality of text fingerprints into a plurality of subsets,
wherein comparing the first text feature and the second formatted document comprises a first comparison and a second comparison performed concurrently, the first comparison being between a first subset of the plurality of subsets and the second formatted document, the second comparison being between a second subset of the plurality of subsets and the second formatted document.

13. A system for comparing documents, comprising:
a processor;
a text analyzer executing on the processor and configured to:
extract a plurality of extracted elements from a first formatted document, wherein each of the plurality of extracted elements corresponds to a text element of the first formatted document,
wherein the plurality of extracted elements comprises at least one selected from a group consisting of a plurality of words and a plurality of word lengths;
a fingerprint extractor executing on the processor and configured to:
extract a first plurality of text fingerprints from a sequence of the plurality of extracted elements to form a first text feature of the first formatted document,
wherein the first plurality of text fingerprints comprises at least one selected from a group consisting of a plurality of word n-grams and a plurality of word length n-grams,
wherein the first text feature comprises at least one selected from a group consisting of a first text content feature based on the plurality of word n-grams and a first text geometric feature based on the plurality of word length n-grams;
a comparison module executing on the processor and configured to:
compare the first text feature and a second text feature of a second formatted document to generate a comparison result, wherein the second text feature comprises at least one selected from a group consisting of a second text content feature and a second text geometric feature, wherein the comparison result comprises at least one selected from a group consisting of a text content match rate between the first and second text content features and a text geometric match rate between the first and second text geometric features; and
determine, in response to the comparison result meeting a pre-determined criterion, that each of the first formatted document and the second formatted document contains a common text content, wherein the comparison result meeting the pre-determined criterion is based on at least one selected from a group consisting of the text content match rate and the text geometric match rate exceeding a pre-determined threshold; and
a repository couple to the processor and configured to store the first formatted document, the plurality of extracted elements, first text feature, and second text feature.

14. The system of claim 13, the comparison module further configured to:
calculate a frequency of occurrence of the first plurality of text fingerprints in the second formatted document,
wherein the comparison result is further based on the frequency of occurrence.

15. The system of claim 14, the text analyzer further configured to:
extract a second plurality of text fingerprints from the second formatted document to form the second text feature of the second formatted document; and
generate, based at least on the second text feature, an inverted index data structure for a document library comprising the second formatted document,
wherein the inverted index data structure comprises a tally of at least one of the second plurality of text fingerprints occurring in the second formatted document, and
wherein the comparison result is generated using the inverted index data structure.

16. The system of claim 13,
wherein the plurality of extracted elements are extracted from a first image generated from at least one selected from a group consisting of a displayed copy and a printed copy of the first formatted document.

17. The system of claim 16, wherein the first plurality of text fingerprints comprises a plurality of n-grams, the fingerprint extractor further configured to:
identify an error rate model of an optical character recognition (OCR) module used to extract the plurality of extracted elements from the first image; and
determine a length of the n-gram based on the error rate model.

18. The system of claim 13,
wherein the first formatted document and the second formatted documents contain the same text content.

19. The system of claim 13,
wherein the first formatted document comprises at least one selected from a group consisting of a subset and a superset of the second formatted document.

20. The system of claim 13,
wherein the text analyzer comprises a text content analyzer configured to extract a plurality of words from the first formatted document as at least a portion of the plurality of extracted elements,
wherein the fingerprint extractor comprises a text content fingerprint extractor configured to extract a segment of consecutive words from the plurality of words, and
wherein the first plurality of text fingerprints is based at least on the segment.

21. The system of claim 13,
wherein text analyzer comprises a text geometric analyzer configured to extract a plurality of word lengths from the first formatted document as at least a portion of the plurality of extracted elements,
wherein the fingerprint extractor comprises a text geometric fingerprint extractor configured to extract a segment of consecutive word lengths from the plurality of word lengths, and
wherein the first plurality of text fingerprints is based at least on the segment.

22. The system of claim 21, wherein at least one word length of the plurality of word lengths is normalized based on a line length where the at least one word length belongs.

23. The system of claim 13,
wherein the first and second text geometric features are extracted in response to determining that the text content match rate is less than the pre-determined threshold.

24. The system of claim 13, the comparison module further configured to:
divide the first plurality of text fingerprints into a plurality of subsets,
wherein comparing the first text feature and the second formatted document comprises a first comparison and a second comparison performed concurrently, the first comparison being between a first subset of the plurality of subsets and the second formatted document, the second comparison being between a second subset of the plurality of subsets and the second formatted document.

25. A non-transitory computer readable medium embodying instructions for comparing documents, the instructions when executed by a processor comprising functionality for:
extracting a plurality of extracted elements from a first formatted document, wherein each of the plurality of extracted elements corresponds to a text element of the first formatted document, wherein the plurality of extracted elements comprises at least one selected from a group consisting of a plurality of words and a plurality of word lengths;
extracting a first plurality of text fingerprints from a sequence of the plurality of extracted elements to form a first text feature of the first formatted document, wherein the first plurality of text fingerprints comprises at least one selected from a group consisting of a plurality of word n-grams and a plurality of word length n-grams, wherein the first text feature comprises at least one selected from a group consisting of a first text content feature based on the plurality of word n-grams and a first text geometric feature based on the plurality of word length n-grams;
comparing the first text feature and a second text feature of a second formatted document to generate a comparison result, wherein the second text feature comprises at least one selected from a group consisting of a second text content feature and a second text geometric feature, wherein the comparison result comprises at least one selected from a group consisting of a text content match rate between the first and second text content features and a text geometric match rate between the first and second text geometric features; and
determining, in response to the comparison result meeting a pre-determined criterion, that each of the first formatted document and the second formatted document contains common text content, wherein the comparison result meeting the pre-determined criterion is based on at least one selected from a group consisting of the text content match rate and the text geometric match rate exceeding a pre-determined threshold.

* * * * *